(12) United States Patent
Kim

(10) Patent No.: US 11,147,109 B2
(45) Date of Patent: Oct. 12, 2021

(54) DOWNLINK DATA TRANSMISSION METHOD AND APPARATUS FOR WIRELESS COMMUNICATION SYSTEM

(71) Applicant: Samsung Electronics Co., Ltd., Gyeonggi-do (KR)

(72) Inventor: Bokkeun Kim, Gyeonggi-do (KR)

(73) Assignee: Samsung Electronics Co., Ltd.

( * ) Notice: Subject to any disclaimer, the term of this patent is extended or adjusted under 35 U.S.C. 154(b) by 33 days.

(21) Appl. No.: 16/534,641

(22) Filed: Aug. 7, 2019

(65) Prior Publication Data

US 2020/0053805 A1 Feb. 13, 2020

(30) Foreign Application Priority Data

Aug. 7, 2018 (KR) .................. 10-2018-0092073

(51) Int. Cl.
*H04W 76/11* (2018.01)
*H04W 48/12* (2009.01)
(Continued)

(52) U.S. Cl.
CPC ............ *H04W 76/11* (2018.02); *H04W 24/02* (2013.01); *H04W 48/06* (2013.01); *H04W 48/12* (2013.01); *H04W 76/30* (2018.02)

(58) Field of Classification Search
CPC ..... H04W 76/11; H04W 48/12; H04W 24/02; H04W 76/30; H04W 48/06; H04W 76/32; H04W 76/02
See application file for complete search history.

(56) References Cited

U.S. PATENT DOCUMENTS

2015/0003435 A1   1/2015  Horn et al.
2015/0103746 A1*  4/2015  Matsushima ........... H04L 69/22
                                                    370/328
(Continued)

FOREIGN PATENT DOCUMENTS

KR   1020180119308   11/2018
WO   WO 2017/126922   7/2017

OTHER PUBLICATIONS

3rd Generation Partnership Project; Technical Specification Group Core Network and Terminals; 3GPP Evolved Packet System (EPS); Evolved General Packet Radio Service (GPRS), 3GPP TS 29.274 V15.4.0 (Aug. 2018) (Year: 2018).*

(Continued)

*Primary Examiner* — Shailendra Kumar
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.
A downlink data transmission method of a mobility management entity (MME) in a wireless communication system is provided. The method includes receiving an update bearer request including information necessary for transmitting downlink data, which is configured to be transmitted over a control plane and is greater than a predetermined size, over a user plane from a serving gateway (SGW), transmitting an evolved-radio access bearer (E-RAB) setup request includ- (Continued)

ing a radio bearer between a terminal and a base station, and an S1 bearer on the user plane between the base station and the SGW to the base station based on the information, and transmitting data to the terminal through the E-RAB established according to the E-RAB setup request.

18 Claims, 11 Drawing Sheets

(51) Int. Cl.
    *H04W 24/02*     (2009.01)
    *H04W 76/30*     (2018.01)
    *H04W 48/06*     (2009.01)

(56) References Cited

U.S. PATENT DOCUMENTS

| | | | | |
|---|---|---|---|---|
| 2015/0245402 | A1* | 8/2015 | Mochizuki | H04W 36/22 370/331 |
| 2015/0312950 | A1* | 10/2015 | Cartmell | H04W 76/38 370/329 |
| 2016/0073308 | A1 | 3/2016 | Okabe et al. | |
| 2017/0262196 | A1* | 9/2017 | Hirose | G06F 3/0617 |
| 2017/0318484 | A1* | 11/2017 | Lindheimer | H04W 40/02 |
| 2018/0368205 | A1* | 12/2018 | Park | H04L 5/0048 |
| 2019/0037629 | A1* | 1/2019 | Ryu | H04W 8/08 |
| 2019/0289571 | A1* | 9/2019 | Park | H04W 68/02 |

OTHER PUBLICATIONS

3rd Generation Partnership Project; Technical Specification Group Core Network and Terminals; 3GPP Evolved Packet System (EPS); Evolved General Packet Radio Service.
(GPRS) Tunnelling Protocol for Control Plane (GTPv2-C); Stage 3 (Release 15), 3GPP TS 29.274 V15.4.0, Jun. 2018, 306 pages.
3rd Generation Partnership Project; Technical Specification Group Services and System Aspects; Telecommunication Management; Performance Management (PM).
Performance Measurements Evolved Packet Core (EPC) Network (Release 15), 3GPP TS 32.426 V15.0.0, Jun. 2018, 92 pages.
International Search Report dated Nov. 13, 2019 issued in counterpart application No. PCT/KR2019/009831, 9 pages.

* cited by examiner

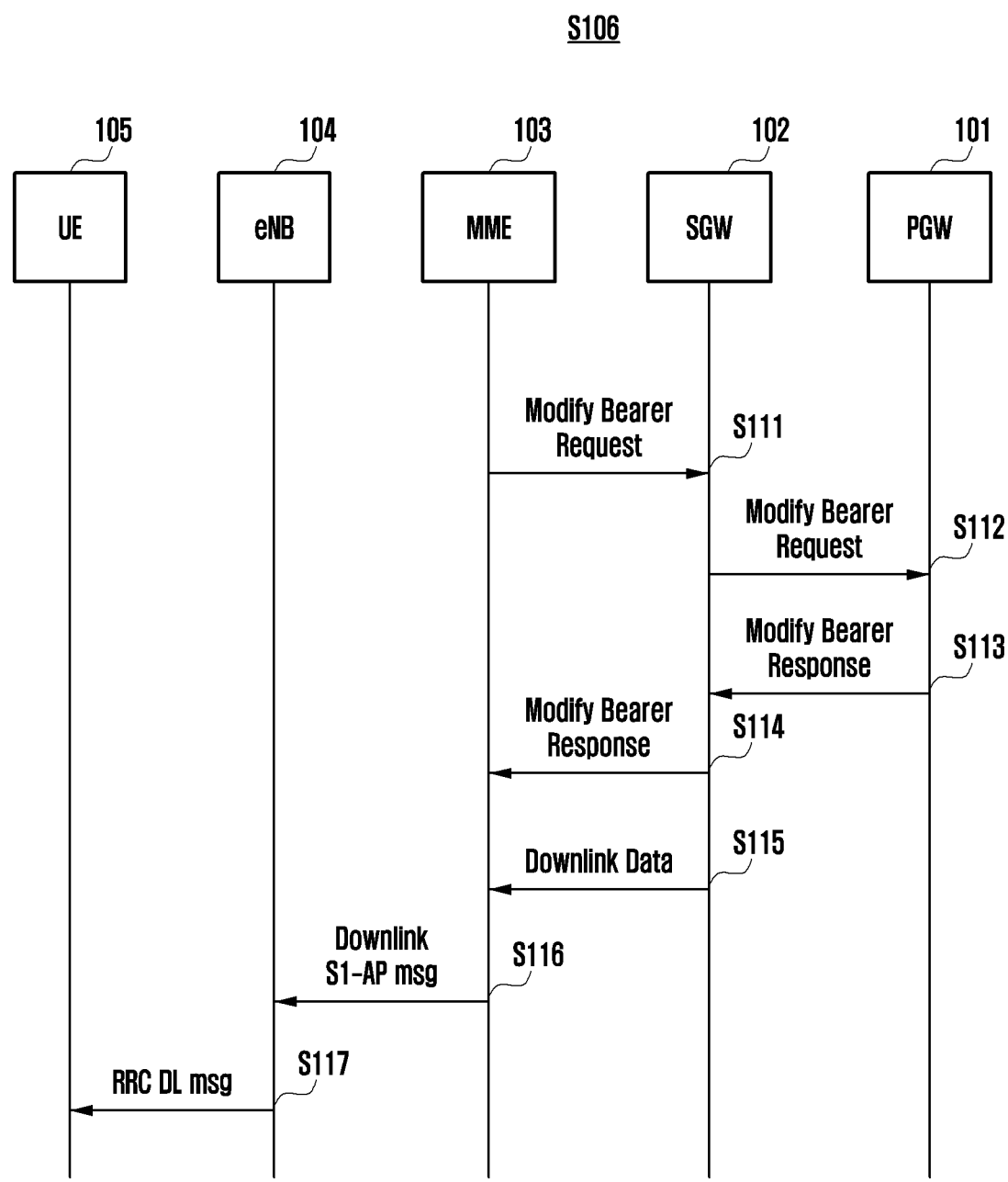

DOWNLINK DATA TRANSMISSION METHOD AND APPARATUS FOR WIRELESS COMMUNICATION SYSTEM

CROSS-REFERENCE TO RELATED APPLICATION(S)

This application is based on and claims priority under 35 U.S.C. 119 to Korean Patent Application Serial No. 10-2018-0092073, filed on Aug. 7, 2018, in the Korean Intellectual Property Office, the entire disclosure of which is incorporated herein by reference.

BACKGROUND

1. Field

The present disclosure relates generally to a method and apparatus for transmitting downlink data to a terminal in a wireless communication system.

2. Description of Related Art

Mobile communication systems were developed to provide subscribers with voice communication services on the move. Recently, mobile communication systems have evolved to the level of supporting high speed data communication services beyond the early voice-oriented services. However, resource shortages and growing user demand for higher speed services are spurring evolution towards more advanced mobile communication systems.

As one of the next-generation mobile communication systems to meet such requirements, standardization for a Long Term Evolution (LTE) system is underway in the $3^{rd}$ Generation Partnership Project (3GPP). LTE is a technology designed to provide high speed packet-based communication of up to 100 Mbps and aims at commercial deployment around 2010. In order to accomplish the aim, a discussion is being held on several schemes: one scheme for reducing the number of nodes located in a communication path by simplifying the configuration of a network, and another scheme for maximally approximating wireless protocols to wireless channels.

To meet the increased demand for wireless data traffic since the deployment of 4G long term evolution (LTE) communication systems, efforts have been made to develop an improved 5G or pre-5G communication system. Therefore, the 5G or pre-5G communication system is also called a "beyond 4G network" or a "post LTE system". Implementation of the 5G communication system in higher frequency (mmWave) bands, e.g., 60 GHz bands, is being considered in order to accomplish higher data rates. To decrease propagation loss of radio waves and increase the transmission distance, beamforming, massive multiple-input multiple-output (MIMO), full dimensional MIMO (FD-MIMO), array antenna, analog beam forming, and large scale antenna techniques are being discussed for the 5G communication system. In addition, in the 5G communication system, there are developments under way for system network improvement based on advanced small cells, cloud radio access networks (RANs), ultra-dense networks, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as advanced coding modulation (ACM) and filter bank multi carrier (FBMC), non-orthogonal multiple access (NOMA), and sparse code multiple access (SCMA) as advanced access technology have been developed.

The Internet, which is a human centered connectivity network where humans generate and consume information, is now evolving into the Internet of things (IoT) where distributed entities, such as things, exchange and process information without human intervention. The Internet of everything (IoE), which is a combination of IoT technology and big data processing technology through connection with a cloud server, has emerged. As technology elements, such as "sensing technology", "wired/wireless communication and network infrastructure", "service interface technology", and "security technology" have been demanded for IoT implementation, recently there has been research into a sensor network, machine-to-machine (M2M) communication, machine type communication (MTC), and so forth. Such an IoT environment may provide intelligent Internet technology services that create new values for human life by collecting and analyzing data generated among connected things. The IoT may be applied to a variety of fields including smart home, smart building, smart city, smart car or connected car, smart grid, health care, smart appliances, and advanced medical services through convergence and combination between existing information technology (IT) and various industrial applications.

In line with these developments, various attempts have been made to apply the 5G communication system to IoT networks. For example, technologies such as a sensor network, MTC, and M2M communication may be implemented by beamforming, MIMO, and array antennas. Application of a cloud RAN as the above-described big data processing technology may also be considered to be an example of convergence between the 5G technology and the IoT technology.

Meanwhile, a technique for user data transfer over the control plane was introduced for processing small packets efficiently in an IoT system, and this technique is called control plane optimization (CP Opt). CP Opt makes it possible to transmit user data over a control plane via a mobility management entity (MME) in interoperation with S11-U/SCEF rather than over a user plane for normal IoT wireless communication.

Although it is taken for granted that a CP Opt-enabled terminal (user equipment (UE)) operates under the presupposition of small data and low transfer frequency, there is no clear definition of what small data and small transfer frequency are. Even for the UE operating in the CP Opt mode, it may occasionally need to receive large volumes of data (big data), for example for firmware update.

It may be possible to infer problems arising when big data are transmitted to an UE operating in the CP Opt mode. Given that an MME can transmit data of 1500 bytes at one time via CP Opt, in order to transfer data of 10 Mbytes over the control plane, the MME has to segment the data into 6000 or more messages. This may cause overload to the MME and raise problems such as data loss. Accordingly, there have been continuous requests from communication mobile carriers (operators) to solve the above problems.

SUMMARY

The present disclosure has been made to address at least the disadvantages described above and to provide at least the advantages described below.

In accordance with an aspect of the present disclosure, a downlink data transmission method of a mobility management entity (MME) in a wireless communication system is provided. The method includes receiving an update bearer request including information necessary for transmitting downlink data, which is configured to be transmitted over a control plane and is greater than a predetermined size, over a user plane from a serving gateway (SGW), transmitting an evolved-radio access bearer (E-RAB) setup request including a radio bearer between a terminal and a base station, and an S1 bearer on the user plane between the base station and the SGW to the base station based on the information, and transmitting data to the terminal through the E-RAB established according to the E-RAB setup request.

In accordance with an aspect of the present disclosure, an MME for transmitting downlink data in a wireless communication system is provided. The MME includes a transceiver configured to transmit and receive signals and a controller configured to control to receive an update bearer request including information necessary for transmitting downlink data, the update bearer request configured to be transmitted over a control plane and being greater than a predetermined size, over a user plane from a SGW, transmit an E-RAB setup request including a radio bearer between a terminal and a base station, transmit an S1 bearer on the user plane between the base station and the SGW to the base station based on the information, and transmit data to the terminal through the E-RAB established according to the E-RAB setup request.

BRIEF DESCRIPTION OF THE DRAWINGS

The above and other aspects, features and advantages of certain embodiments of the disclosure will be more apparent from the following detailed description taken in conjunction with the accompanying drawings, in which:

FIG. 1B is a diagram of a CP Opt (S11-U) PDN establishment procedure triggered by a control plane service request (S11-U), according to an embodiment;

DETAILED DESCRIPTION

Figure 1A:
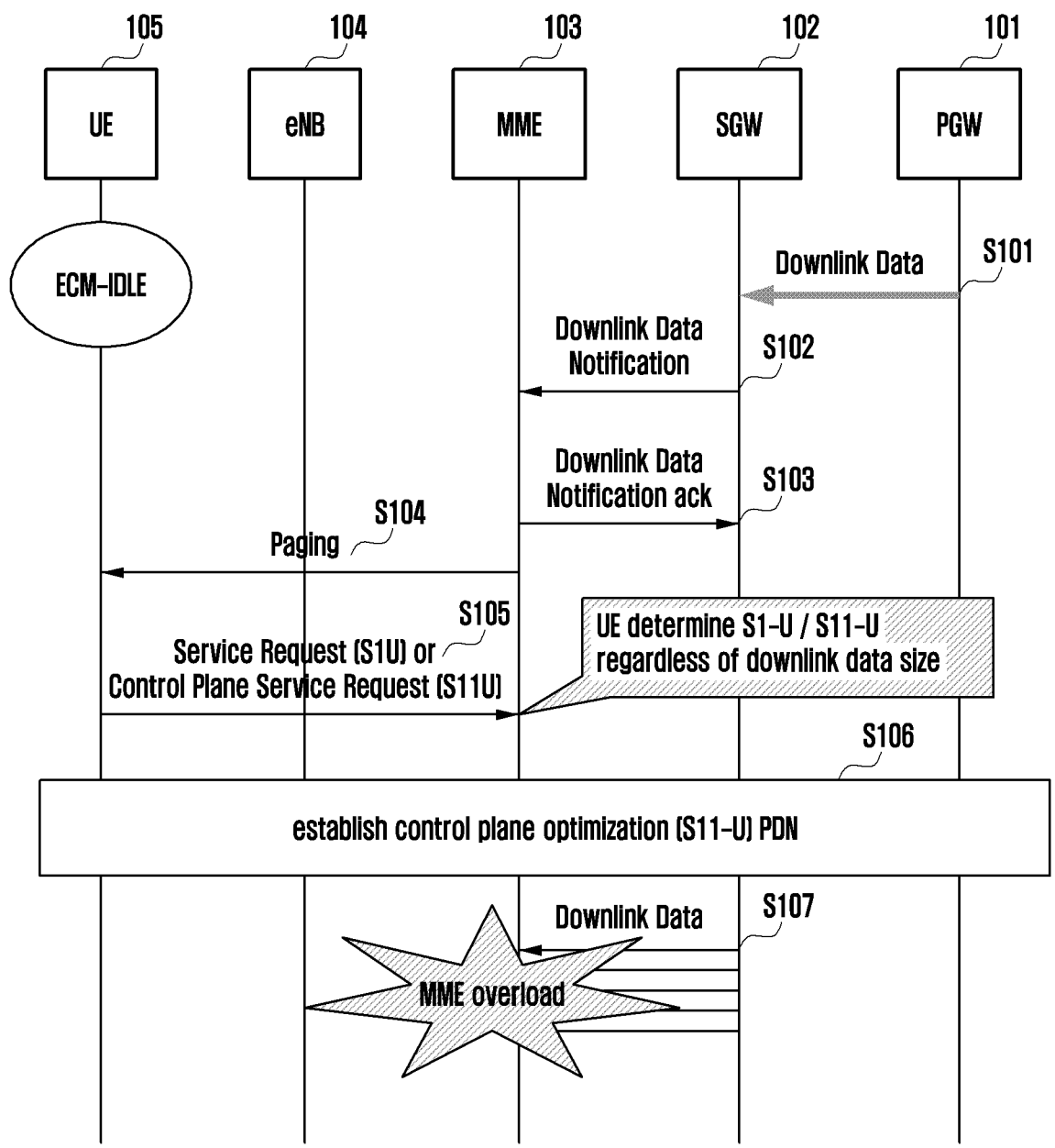
FIG. 1A is a diagram of an MME overload situation caused by downlink big data, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device indicates different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. Terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an IoT device (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

Hereinafter, an electronic device will be described with reference to the accompanying drawings. In the disclosure, the term "user" indicates a person using an electronic device or a device (e.g., an artificial intelligence electronic device) using an electronic device A description is made of a downlink data transmission method of an MME in a wireless communication system. Typically, CP Opt is used as an enabler of IoT wireless communication for making it possible to transfer user data over a control plane via an MME rather than a user plan. The disclosed methods and apparatuses have been conceived to compensate for the lack of capability of CP Opt in processing large volumes of data.

Data may be categorized by a predetermined size. Data greater than the predetermined size may be categorized as large volumes of data (big data), large volume data, or large volume packet, and data less than the predetermined size may be categorized as small volume data or small volume packet. While the small volume data transmitted over the control plane may cause no MME overload, big data transmitted over the control plane is likely to cause MME overload.

In order to process the small volume data efficiently in the IoT system, a mechanism of transferring user packets over the control plane has been introduced under the name of CP Opt. In comparison with the S1-U interface for high speed data communication over a user plane between an evolved Node B (eNB) and a gateway (GW), CP Opt makes it possible for the eNB to transmit data to the GW via the MME over the control plane through an S11-U interface.

When applying CP Opt for small volume data that is transmitted less frequently, it is advantageously possible to reduce traffic by piggybacking the user data on a control plane service request message. When transmitting a large volume of user data via CP Opt, the user data should be segmented into small data units, which leads to a large amount of traffic and results in MME overload and user data packet loss.

Assuming transmission of a large volume of user data, the user data should be segmented into small data units (e.g., about a 1500-byte unit for Samsung Core) so as to be transmitted. This is because the size of the user data that can be piggybacked on a control plane message and processed by the MME in CP Opt is limited. Accordingly, it is preferable that less-frequently transmitted small volume data is processed in CP Opt.

Mobile originated (MO) data triggered by a UE may be switched between a CP Opt (S11-U) and an S1-U that support high-speed packet transmission according to the size or type of data. However, mobile terminated (MT) data triggered by a network is not switched between the CP Opt (S11-U) and the S1-U. Thus, it is transmitted to the MME in the form of a large amount of traffic.

Assuming a situation of receiving downlink data of 15 Mbytes, the data is segmented into about 10000 messages to be transmitted the MME, which means that the MME has to process 10000 subscribers' calls simultaneously. This may cause MME overload and impact processing of all subscribers' calls.

Such a situation may arise when a UE updates its firmware. The UE may be configured to transmit small volume data of a few hundred bytes and reduce traffic via CP Opt. However, if the firmware update is performed with a few Mbytes of MT data, downlink big data may be transmitted to a plurality of UEs (typically, an IoT system is characterized by a large number of IoT UEs communicating small amounts of traffic) during a short time period. This triggers a user packet overload control mechanism, which may cause user data transmission failures of other UEs.

If the big data transmission that causes the overload situation is not controlled, retransmission of the transmission-failed data may aggravate the overload. The aggravated overload situation is likely to impact the call processing traffic as well as the user packets, resulting in a total disturbance of the MME.

The disclosed methods and apparatus aim to compensate for the lack of capability of CP Opt for transmitting user data over the control plane in an IoT system. By compensating for the lack of capability of CP Opt in such a way as to avoid overload to the MME, even when the MME receives a large volume of packets from a network server (MT), it may be possible to minimize signaling failures of other subscribers and guarantee user packet reliability.

Disclosed herein is a method for processing a large volume of packets for a subscriber using an S11-U (CP Opt) packet data network (PDN) by switching the transmission to the S1-U PDN that facilitates the large volume of packets. Also disclosed herein is a method for processing a large volume of packets transmitted from a network to a UE according to a current state (ECM-IDLE/CM-ACTIVE) and quality of service (QoS) of the UE, leaving out of discussion the conventional method of switching a large amount of UE-triggered (MO) packets to the S1-U connection.

In an evolved packet system connection management-IDLE (ECM-IDLE), the MME may be able to process big data through an S1-UE setup upon receipt of a downlink data notification. In the ECM-ACTIVE mode, the MME may process big data as follows.

First, the MME may switch downlink data from an S11-U connection to an S1-U connection for processing the big data. Second, the MME may process the big data through a bearer modification procedure.

FIG. 1A is a diagram of an MME overload situation caused by downlink big data, according to an embodiment. A UE in the ECM-IDLE state needs to establish a user plane (S1-U or S11-U) bearer for receiving data. If an S11-U bearer is established for transmitting big data, this may cause MME overload.

At step S101, a PGW 101 may transmit downlink data to an SGW 102. The PGW 101 may receive data from a PDN as an internet protocol (IP) network and transmit the data to the SGW 102.

At step S102, the SGW 102 may transmit a downlink data notification message to an MME 103. If the SGW 102 receives downlink data for a UE 105 in an idle state from the PGW 101, it may notify the MME 103 of the receipt of the downlink data. Because the downlink data notification message includes no information on the size of the data, the UE 105 cannot know the size of the downlink data.

The MME 103 may transmit a downlink data notification ACK message to the SGW 102 at step S103 and a paging message to the UE 105 at step S104. The MME 103 may trigger paging for the UE 105 in the idle state.

At step S105, the UE 105 may transmit a service request (S1-U) or a control plane service request (S11-U) to the MME 103. The UE 105 may determine the message to be transmitted according to an internal rule.

According to the message being transmitted by the UE 105, a bearer corresponding to one of the S1-U and S11-U interfaces may be established. The bearer may be established with no consideration of the downlink data size, because the UE 105 cannot know the downlink data size. It may be assumed that the UE 105 transmits the control plane service request (S11-U) at step S105.

At step S106, a CP Opt (S11-U) PDN may be established. The control plane optimization (S11-U) PDN establishment procedure is described later with reference to FIG. 1B.

If data are transmitted from the SGW 102 to the MME 103 at step S107 over the CP Opt PDN, an overload may occur at the MME 103. After the CP Opt (S11-U) PDN is established at step S106, downlink big data may cause MME overload on the control plane as described above.

FIG. 1B is a diagram of a CP Opt (S11-U) PDN establishment procedure triggered by a control plane service request (S11-U), according to an embodiment. If the control plane service request (S11-U) message is received from a UE 105, the MME 103 may establish the CP Opt (S11-U) PDN.

The MME 103 transmits a modify bearer request message to the SGW 102 at step S111, and the SGW 102 may transmit the modify bearer request message to the PGW 101 at step S112. A message for establishing an S11-U bearer between the SGW 102 and the MME 103 may be transmitted to network nodes (MME, SGW, and PGW).

The PGW 101 may transmit a modify bearer response message to the SGW 102 at step 113, and the SGW 102 may transmit the modify bearer response message to the MME 103 at step S114. Steps S113 and S114 may correspond to steps S111 and S112.

Afterward, the SGW may transmit downlink data to the MME 103 at step S115. Once an S11-U bearer is established between the SGW 102 and the MME 103, the downlink data may be delivered over the CP Opt (S11-U) PDN.

The MME 103 may transmit a downlink S1-AP message to the eNB 104 at step S116, and the eNB 104 may transmit an RRC downlink message to the UE 105 at step S117. The MME 103 may transmit a non-access stratum (NAS) message to notify the UE 105 that an S11-U bearer has been established in response to the Control Plane service request transmitted at step S105.

Figure 2A:
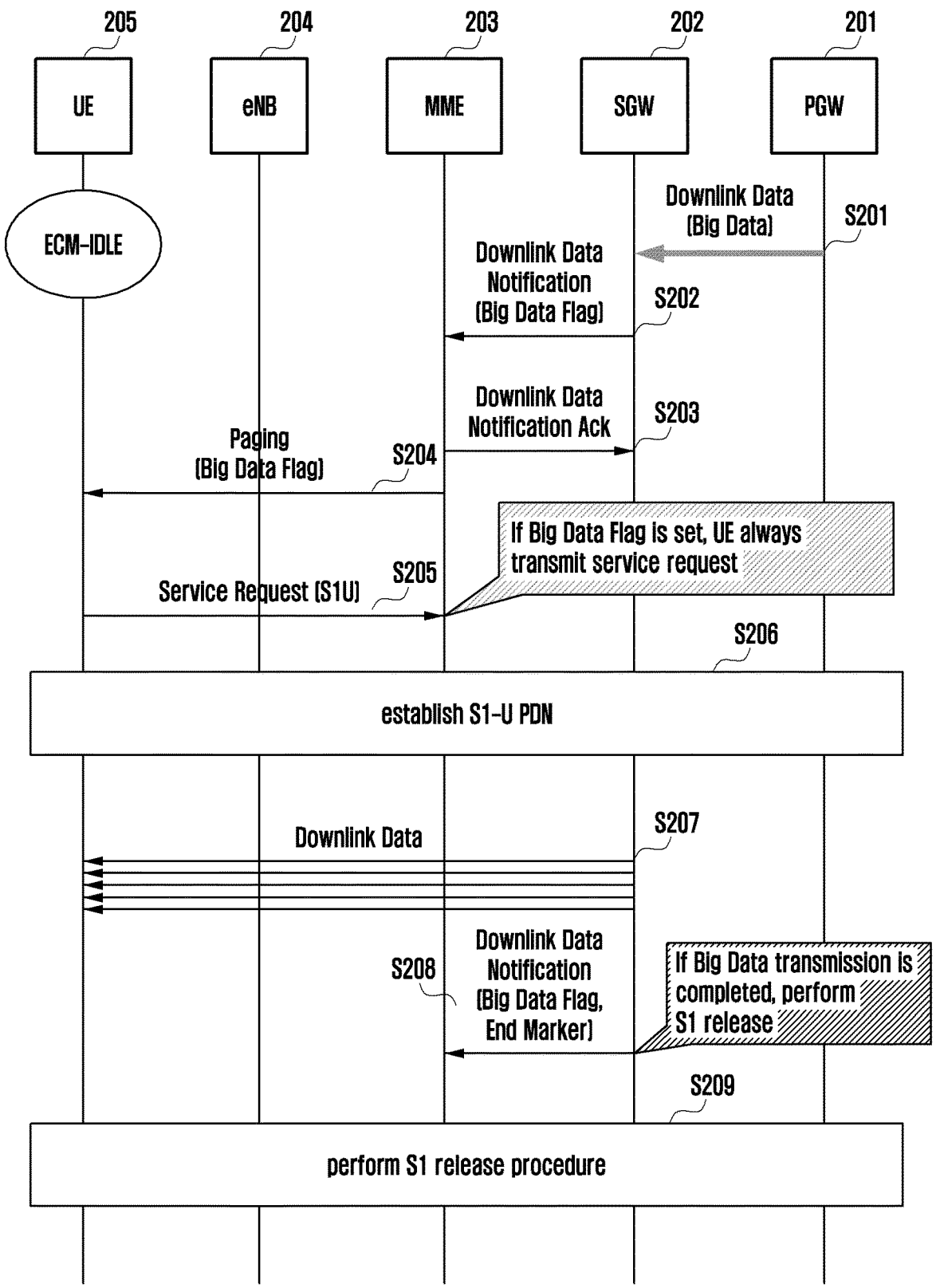
FIG. 2A is a diagram of a downlink data transmission method, according to an embodiment.

FIG. 2A is a diagram of a downlink data transmission method, according to an embodiment.

An S1-U bearer may be established for processing downlink big data for a UE in the idle state. Because whether to use the S1-U or S11-U connection is not determined for a UE in the idle state, it may be possible to control such that an S1-U bearer is set up. The impact network entity that influences the method is a UE, an MME, and an SGW.

At step S201, a PGW 201 may transmit downlink data to an SGW 202. The PGW 201 may receive the data from a PDN as an IP network and transmit the data to the SGW 202.

At step S202, the SGW 202 may transmit a downlink data notification message to an MME 203. If the SGW 202 receives the downlink data for a UE in an idle state from the PGW 201, it may notify the MME 203 of the receipt of the downlink data. If the downlink data is greater than a predetermined size, the SGW 202 may set a big data flag in the downlink data notification message.

The MME 203 may transmit a downlink data notification ACK message to the SGW 202 at step S203 and transmit a paging message to the UE 205 at step S204. If the downlink data notification message received from the SGW 202 includes the big data flag, the MME 203 may set the big data flag in the paging message for the UE 205. The MME 203 may trigger paging for the UE 205 in the idle state.

At step S205, the UE 205 may transmit a service request (S1-U) message to the MME 203. If the big data flag is set in the paging message, the UE 205 may transmit a service request message to the MME 203 for setup of an S1-U PDN.

At step S206, the S1-U PDN may be established in correspondence to the service request (S1-U) message. An S1-U PDN establishment procedure is described later with reference to FIG. 2B.

At step S207, the SGW 202 may transmit downlink data to the UE 205. The downlink data may be delivered to the UE 205 through a bearer (connection between the eNB 204 and the SGW 202) established according to the service request (S1-U) message transmitted at step S205

At step S208, the SGW 202 may transmit a downlink data notification message to notify the MME 203 of completion of big data transmission. The SGW 202 may set a big data transmission completion indicator (big data flag and end marker) in the downlink data notification message.

At step S209, the MME may perform an S1 release procedure. After the S1 release procedure is completed, one of the S1-U and S11-U connections may be selected and set up according to a UE policy.

Figure 2B:
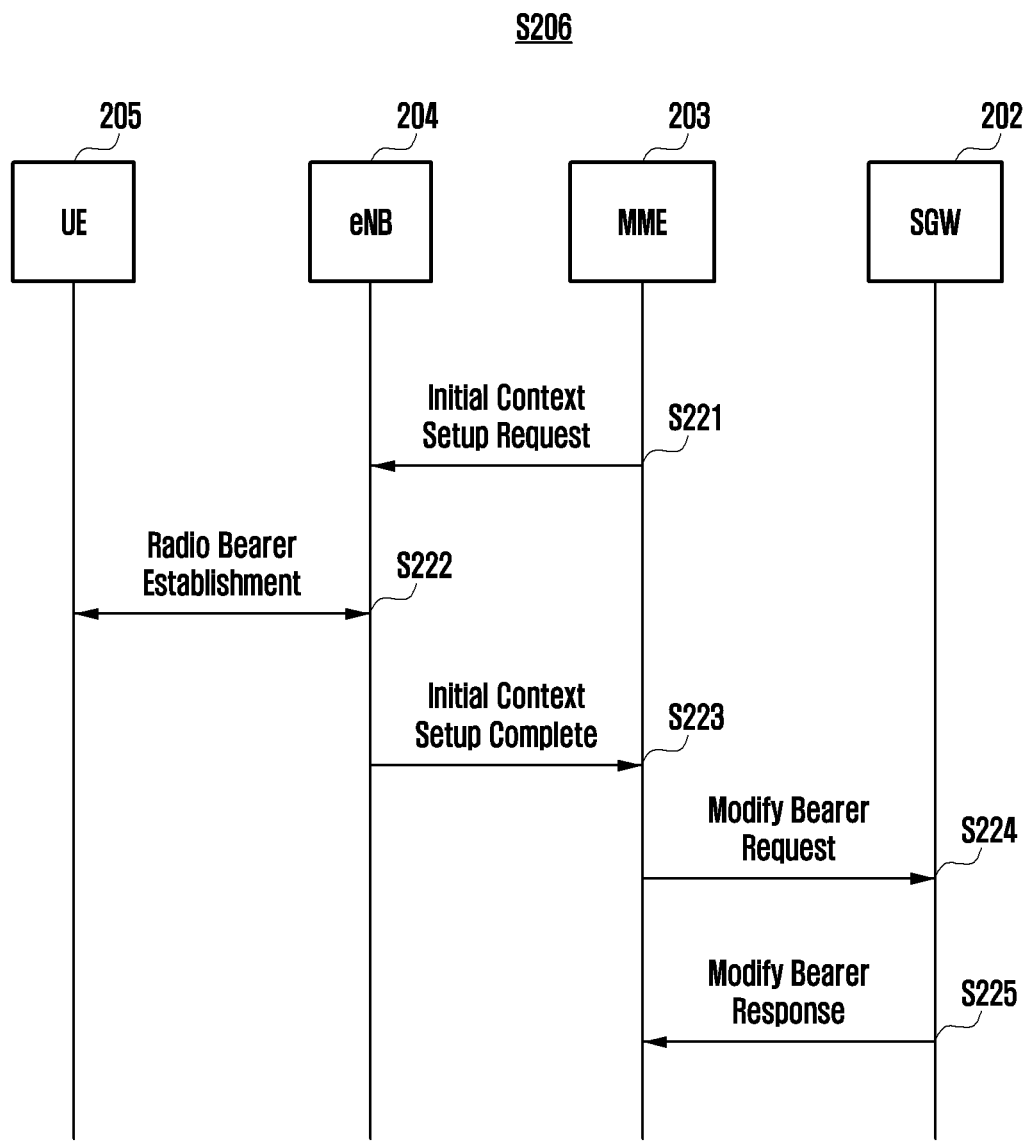
FIG. 2B is a flowchart of an S1-U PDN establishment procedure triggered by a service request (S1-U) message, according to an embodiment.

FIG. 2B is a flowchart of an S1-U PDN establishment procedure triggered by a service request (S1-U) message, according to an embodiment. Upon receipt of the service request (S1-U) message, an MME may establish an S1-U bearer in the user plane.

At step S221, the MME 203 may transmit an initial context setup request message to the eNB 204. At step S222, a radio bearer establishment procedure may be performed between the eNB 204 and the UE 205.

At step S223, the eNB 204 may transmit an initial context Setup complete message to the MME 203. A radio bearer may be established between the UE 205 and the eNB 204 through steps S221 to S223.

The MME 203 may transmit a modify bearer request message to the SGW 202 at step S224, and the SGW 202 may transmit a modify bearer response message to the MME 203 at step S225. An S1-U bearer may be established between the SGW 202 and the eNB 204 through steps S224 and S225.

Figure 2C:
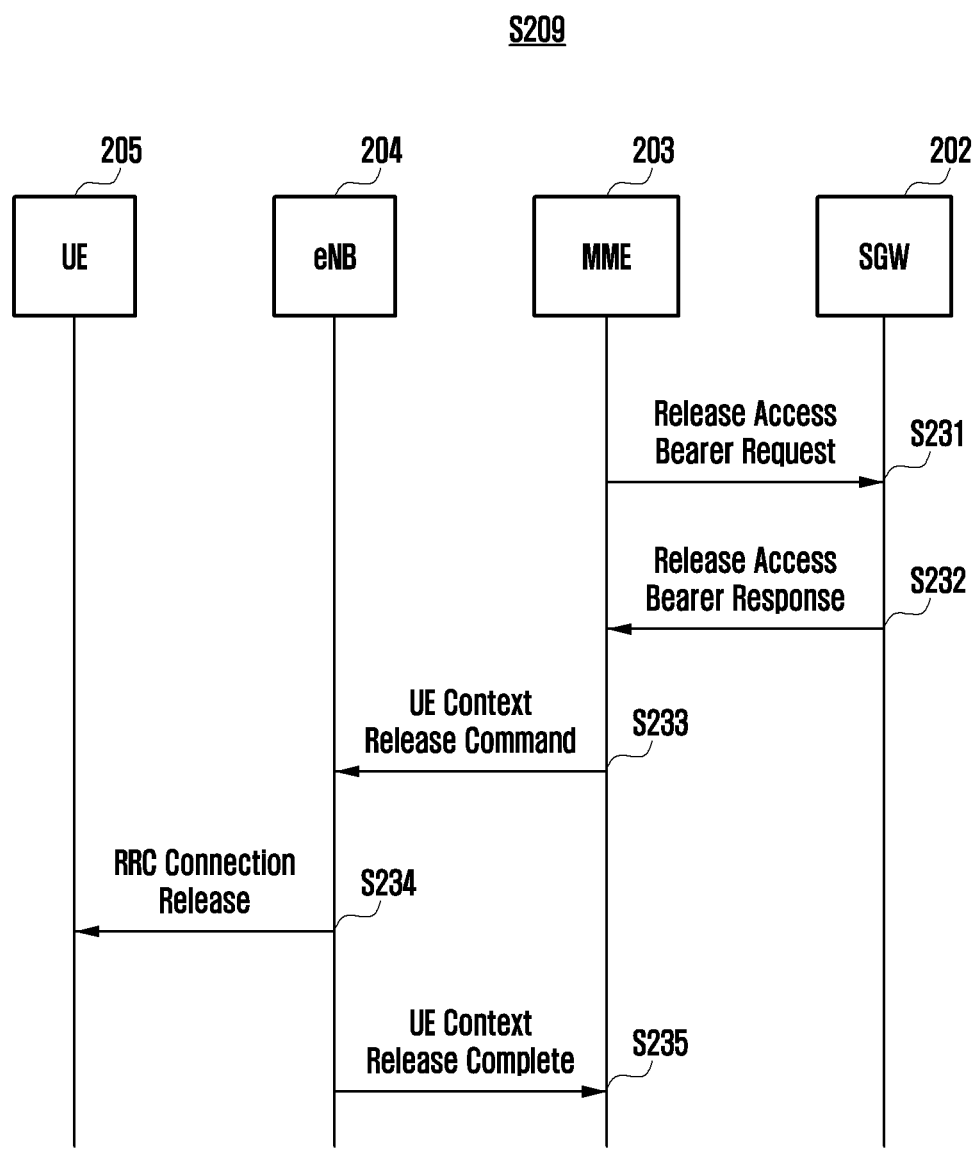
FIG. 2C is a diagram of an S1 release procedure, according to an embodiment.

FIG. 2C is a diagram of an S1 release procedure, according to an embodiment. The MME transmits a release access bearer request message to the SGW and a UE context release command to the eNB to initiate the S1 release procedure.

The MME 203 may transmit a release access bearer request message to the SGW 202 at step S231, and the SGW 202 may transmit a release access bearer response message to the MME 203 at step S232. A bearer established with the SGW 202 may be released through steps S231 and S232. The bearer being released may be an S1-U bearer established between the SGW 202 and the eNB 204 or a CP Opt (S11-U) bearer established between the SGW 202 and the MME 203.

At step S233, the MME 203 may transmit a UE context release command message to the eNB 204. At step 234, the eNB 204 may transmit an RRC connection release message to the UE 205. After receiving the UE context release command message, the eNB 204 may delete the UE context and release the RRC connection established with the UE 205.

At step S235, the eNB 204 may transmit a UE context release complete message to the MME 205. Upon receipt of the UE context release complete message, the MME 203 may assume that the user information has been deleted in the eNB.

Through the S1 release procedure, the UE transitions to the ECM-IDLE state. If there is user traffic arriving after the S1 release procedure, the UE may transition to the ECM-ACTIVE state to receive data via the S1-U/S11-U bearer, which is established according to the UE policy.

Figure 3:
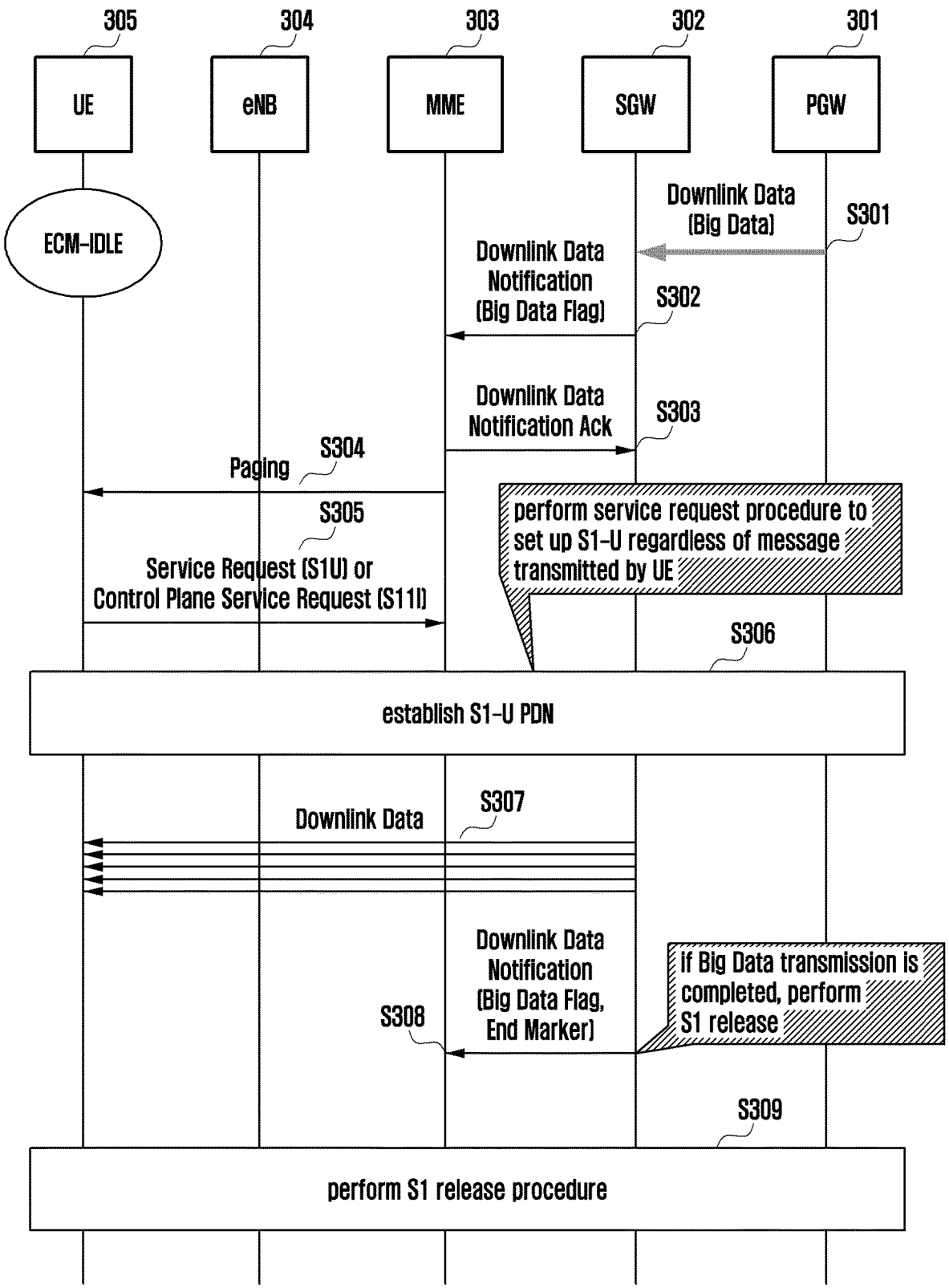
FIG. 3 is a diagram of a downlink data transmission method, according to an embodiment.

FIG. 3 is a diagram of a downlink data transmission method, according to an embodiment.

In comparison with FIGS. 2A and 2B, the impact network entity that influences this method is an MME and an SGW, which means that a method is implemented in a core network regardless of a UE. Even when the MME receives a control plane service request (S11-U) from a UE after receiving a big data flag, it may establish an S1-U bearer to perform big data transmission.

At step S301, a PGW 301 may transmit downlink data to an SGW 302. The PGW 301 may receive the data from a PDN as an IP network and transmit the data to the SGW 302.

At step S302, the SGW 302 may transmit a downlink data notification message to an MME 303. Step S302 may correspond to step S202.

At step S303, the MME 303 may transmit a downlink data notification ACK message to the SGW 302. Step S303 may correspond to step S203.

At step S304, the MME 303 may transmit a paging message to the UE 305. Unlike the paging message being transmitted at step S204 along with a big data flag set therein, the paging message being transmitted from the MME 303 to the UE at step S304 includes no big data flag set therein. The UE 305 cannot know whether the downlink data is big data.

At step S305, the UE 305 may transmit a service request (S1-U) message or a control plane service request (S11-U) message to a UE 305. Because the big data flag is not set in the paging message, the UE 305 may transmit the service request message or the control plane service request message without consideration of big data.

At step S306, an S1-U PDN establishment procedure may be performed regardless of the service request message transmitted from the UE 305 to the MME 303. The control plane service request message includes all information that is included in the service request message for S1-U Setup. Even though the MME 303 receives the control plane service request message, it may perform a service request procedure. The S1-U PDN establishment procedure may be performed in the same manner as the procedure of step S206.

At step S307, the SGW 302 may transmit downlink data to the UE 305. Step S307 may correspond to step S207.

At step S308, the SGW 302 may transmit a downlink data notification message to notify the MME 303 of completion of big data transmission. Step 308 may correspond to step S208.

At step S309, the MME 303 may perform an S1 release procedure. Step S309 may correspond to step S209.

Figure 4:
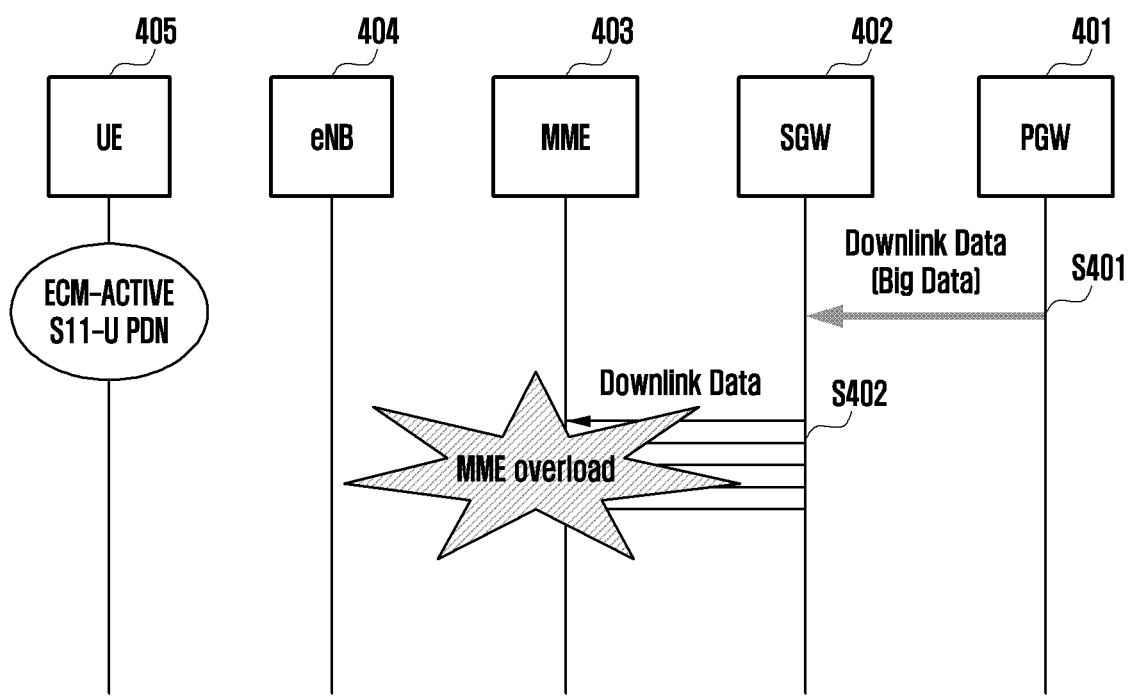
FIG. 4 is a diagram of an MME overload situation caused by downlink big data, according to an embodiment.

FIG. 4 is a diagram of an MME overload situation caused by downlink big data, according to an embodiment. The MME overload may occur when the MME processes a large volume packet in the middle of transmitting user packets to a UE in the ECM-ACTIVE state over a CP Opt (S11-U) PDN in a control plane. In order to process the big data for the UE in the ECM-ACTIVE state, it is necessary to release the S11-U PDN set up already in the control plane and establish a user plane bearer (method of processing large volume messages through S1-U release followed by S1-U switching) or modify a bearer (method of processing large volume messages through bearer modification procedure).

At step S401, a PGW 401 may transmit downlink data to an SGW 402. The downlink data may be big data. At step S402, the SGW 402 may transmit the received downlink data to the MME 403. While a UE 405 in the ECM-ACTIVE state is receiving user packets over the CP Opt (S11-U) PDN in the control plane, the big data transmission to the UE 405 over the CP Opt PDN may cause MME overload.

Figure 5:
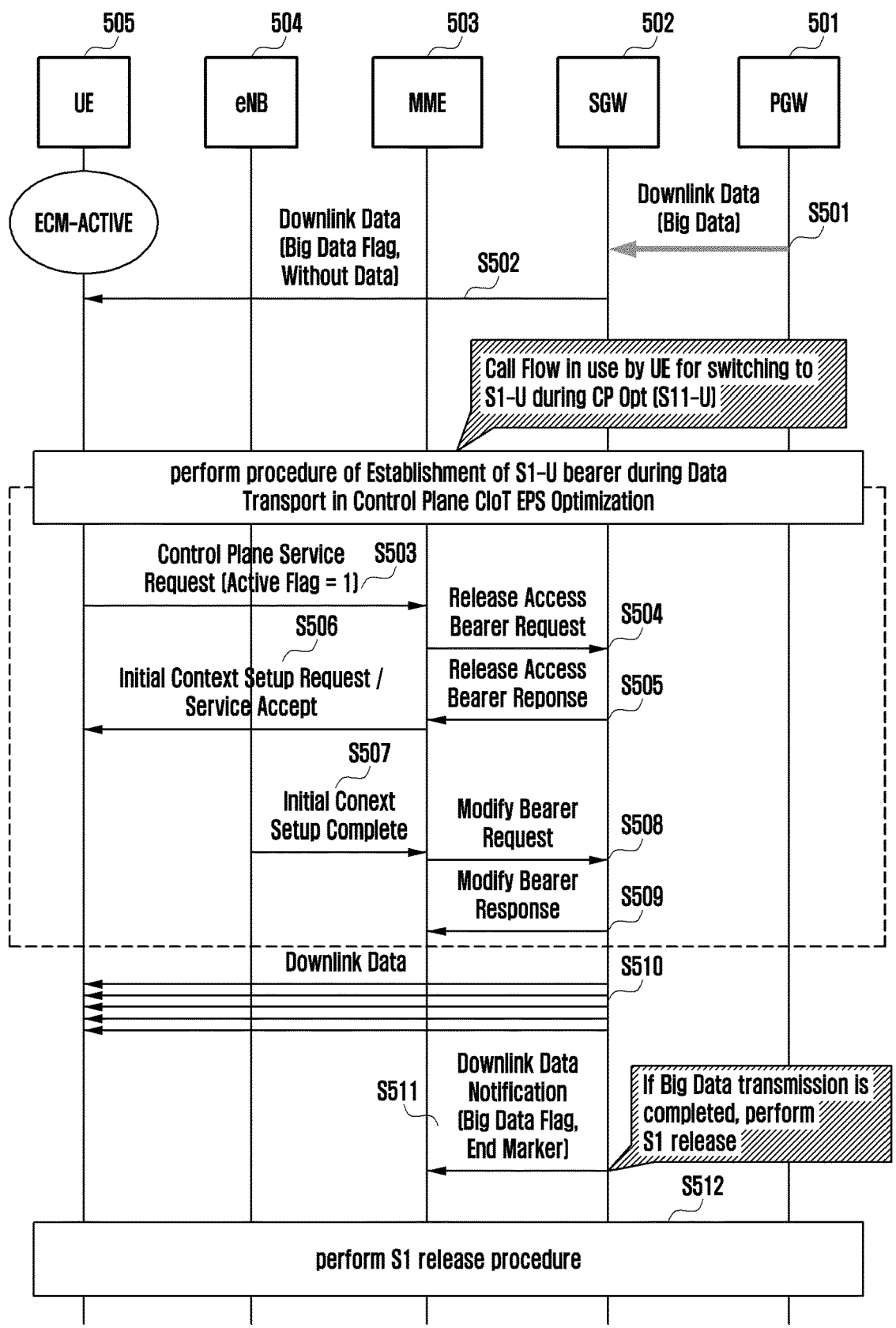
FIG. 5 is a diagram of a downlink data transmission method, according to an embodiment.

FIG. 5 is a diagram of a downlink data transmission method, according to an embodiment.

It may be possible to switch from the control plane to the user plane (S1-U switching) for processing big data for a UE in the ECM-ACTIVE state. If downlink data are detected, it may be possible to notify the UE of big data transmission (by transmitting a big data flag). The UE may release a previously established S11-U PDN and trigger switching to an S1-U PDN. Because a procedure of switching between the S1-U and S11-U connections is typically used, the method makes it possible to facilitate the downlink big data transmission while minimizing any side effects.

At step S501, a PGW 501 may transmit downlink data to an SGW 502. The PGW 501 may transmit big data received from a PDN as an IP network to the SGW 502.

At step S502, the SGW 502 may transmit the downlink data to a UE 505 via an MME 503 and an eNB 504. The downlink data may be transmitted along with a big data transmission indicator (big data flag) set therein. However, the downlink data may not include any user data in order to obviate any possibility of MME overload.

At step S503, the UE 505 may transmit a control plane service request message to the MME 503. The UE 505 may set an active flag to 1 in the control plane service request message. Upon receipt of the control plane service request message including the active flag set to 1, the MME 503 may trigger a procedure for switching from a CP Opt (S11-U) connection of the control plane to an S1-U connection of the user plane.

At step S504, the MME 503 may transmit a release access bearer request message to the SGW 502. The MME 503 may transmit the release access bearer Request message to release a user plane bearer_in a previously established CP Opt (S11-U) connection. At step S505, the SGW 502 may transmit a release access bearer response message to the MME 503.

At step S506, the MME 503 may transmit an initial context setup request and service accept message to the UE 505. At step S507, the MME 503 may receive an initial context setup complete message from the eNB 504.

At step S508, the MME 503 may transmit a modify bearer request message to the SGW 502. The MME 503 may transmit the modify bearer request message to set up an S1-U bearer in the user plane. At step S509, the SGW 502 may transmit a modify bearer response message to the MME 503.

At step S510, the SGW may transmit downlink data to the UE 505. Step S510 may correspond to step S207.

At step S511, the SGW 502 may transmit a downlink data notification message to the MME 503 to notify the MME 503 of completion of big data transmission. Step S511 may correspond to step S208.

At step S512, the MME 503 may perform an S1 release procedure. Step S512 may correspond to step S209.

Figure 6:
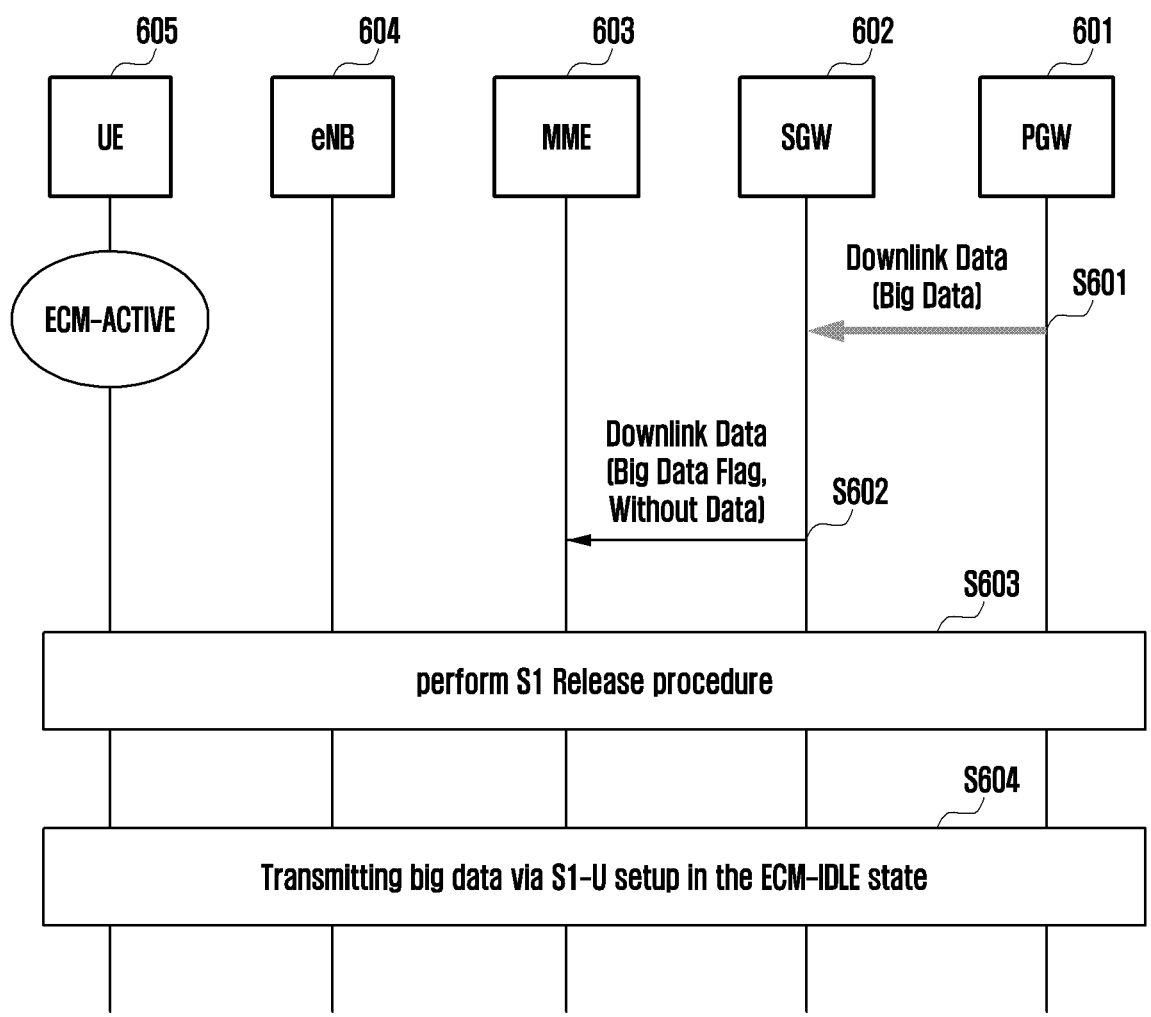
FIG. 6 is a diagram of a downlink data transmission method, according to an embodiment.

FIG. 6 is a diagram of a downlink data transmission method, according to an embodiment.

In comparison with FIG. 5, the impact network entity that influences the method is an MME and an SGW, which means that a method is implemented in a core network regardless of a UE. If the MME receives a big data flag, it may release a CP Opt (S11-U) connection in the control plane and establish an S1-U bearer in the user plane for big data transmission to a UE in the ECM-ACTIVE state.

At step S601, the PGW may transmit downlink data to a SGW 602. The PGW 601 may transmit big data received from a PDN as an IP network to the SGW 602.

At step S602, the SGW may transmit the downlink data to the MME 603. A big data transmission indicator may be set in the downlink data. In order to obviate any possibility of MME overload, the downlink data may not include user data.

At step S603, an S1 release procedure may be performed. The S1 release procedure may be triggered by the MME 603. Because the UE 605 is in the ECM-ACTIVE state, the release procedure may be performed to release an S11-U bearer. If the S11-U bearer is released, the UE may enter the ECM-IDLE state such that the user plane connection is released. The S1 release procedure may be performed in the same manner as described with reference to step S209.

At step S604, The downlink big data can be transmitted by generating the S1-U PDN in the ECM-IDLE state. The method of transmitting big data may correspond to the second embodiment of FIG. 3 because the UE 605 is in the ECM-IDLE mode.

Figure 7:
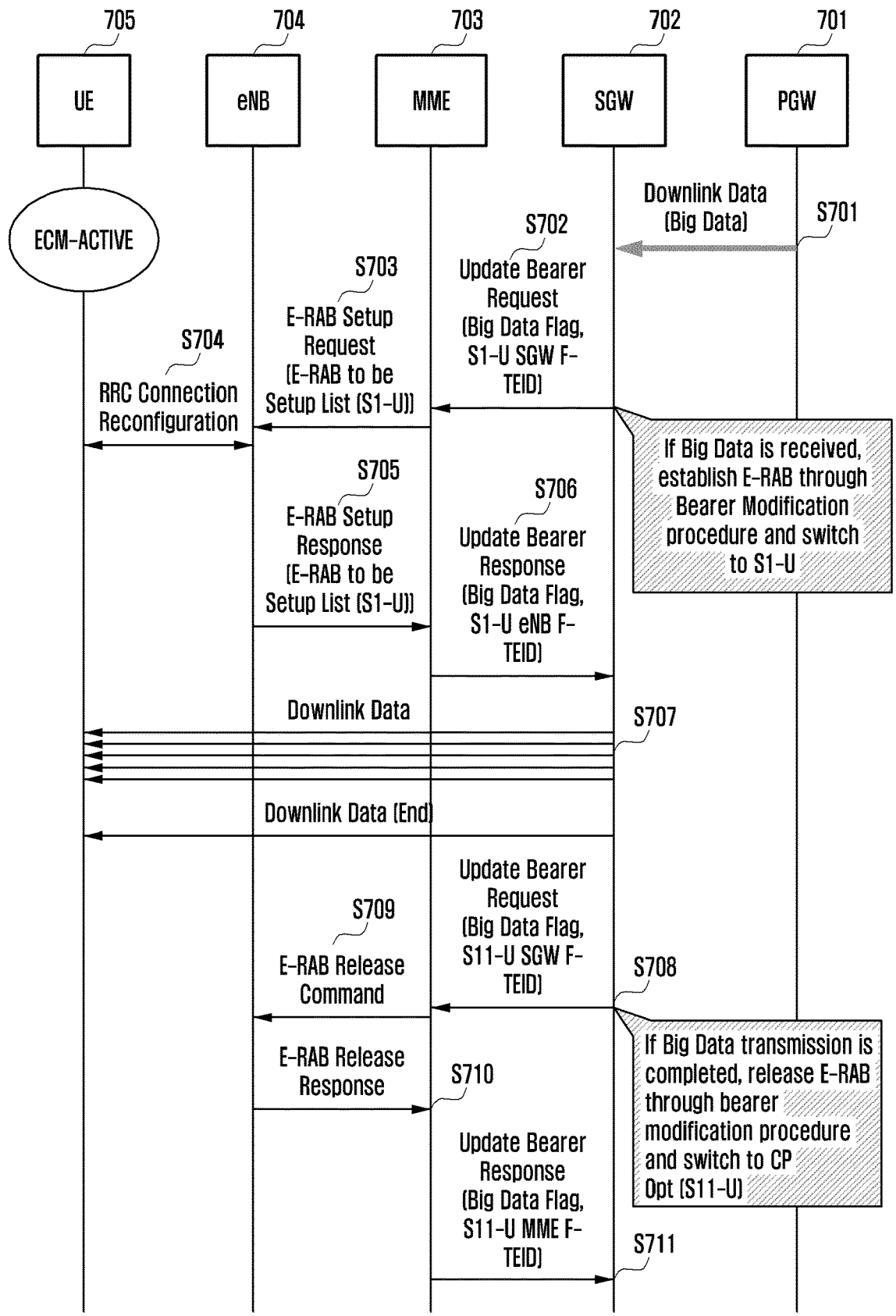
FIG. 7 is a diagram of a downlink data transmission method, according to an embodiment.

FIG. 7 is a diagram of a downlink data transmission method, according to an embodiment.

If an SGW receives a large volume message, it triggers a bearer modification procedure such that an MME switches from a CP Opt (S11-U) PDN in the control plane to an S1-U PDN in the user plane, thereby obviating any possibility of MME overload caused by downlink big data.

Through the bearer modification procedure for big data transmission, the SGW may switch from an IP address and tunnel endpoint identifier (TEID) for the CP Opt (S11-U) connection to an IP address and TEID for an S1-U connection and transmit the big data via an S1-U path in the user plane. The MME may also request to an eNB for establishing a new evolved radio access bearer (E-RAB), and the eNB may perform an RRC connection reconfiguration procedure with a UE to establish an E-RAB for connection between the UE and the SGW via the eNB.

The E-RAB consists of a radio bearer between the UE and the eNB and an S1 bearer between the eNB and the SGW, and it allows a user packet configured to be delivered over the control plane to be transmitted over the user plane. It may be possible to perform the S1-U switching with signaling traffic less than that in FIGS. 5 and 6 while minimizing any UE impact.

At step S701, a PGW 701 may transmit downlink data to an SGW 702. The PGW 701 may transmit big data received from a PDN as an IP network to the SGW 702.

At step S702, the SGW 702 may transmit an update bearer request message to an MME 703. The Update Bearer Request message may include a big data transmission indicator (big data flag) and an S1-U SGW F-TEID. The S1-U SGW F-TEID may include an IP address, interface type, and TEID of the SGW 702 for a user plane connection between the SGW 702 and the eNB 704.

At step S703, the MME 703 may transmit an E-RAB setup request message to the eNB 704. The E-RAB setup request message may include an E-RAB to be setup list, which may contain an S1-U SGW F-TEID received from the SGW 702.

At step S704, the eNB 704 may perform an RRC connection reconfiguration procedure with the UE 705. The eNB 704 may trigger the RRC connection reconfiguration procedure between the UE 705 and the eNB 704 for establishing a new E-RAB based on the S1-U IP address and TEID included in the E-RAB Setup Request message.

At step S705, the eNB 704 may transmit an E-RAB Setup Response message to the MME 703. The E-RAB setup response message may include an E-RAB to be setup list, which may contain an IP address of the eNB 704.

At step S706, the MME may transmit an update bearer response message to the SGW 702. The update bearer response message may include an S1-U eNB F-TEID. The S1-U eNB F-TEID may include an IP address, interface type, and TEID of the eNB 704 for establishing a user plane connection between the SGW 702 and the eNB 704. Upon receipt of the update bearer response message, the SGW 702 may update the S1-U eNB information. As a consequence, an E-RAB is established as a connection between the UE 705 and the SGW 702 via the eNB 704.

At step S707, the SGW 702 may transmit downlink data to the UE 705. Through the E-RAB established through steps S702 to S706, big data may be transmitted over the user plane rather than the control plane. Because the big data is transmitted over the user plane, it may be possible to obviate any possibility of MME overload.

Once the downlink big data transmission is completed, the SGW 702 may transmit an update bearer request message to the MME 703 at step S708. The update bearer request message may include S11-U SGW F-TEID and a big data flag indicating that the big data transmission has been completed. The S11-U SGW F-TEID may include an IP address, interface type, and TEID of the SGW 702 for establishing a connection between the SGW 702 and the MME 703. Because the big data transmission has been completed, the S1-U bearer established for the big data transmission over the user plane may be released, and a CP Opt (S11-U) connection may be reestablished for data transmission over the control plane.

At step S709, the MME 703 may transmit an E-RAB release command message to the eNB 704. The E-RAB is released by the E-RAB release command message, and the eNB 704 and the MME 703 may establish a control plane connection. At step S710, the eNB 704 may transmit an E-RAB release response message to the MME 703.

At step S711, the MME may transmit an update bearer response message to the SGW 702. The update bearer response message may include an S11-U MME F-TEID. The S11-U MME F-TEID may include an IP address, interface type, and TEID of the MME 703 for use in establishing a control plane connection between the MME 703 and the SGW 702. Upon receipt of the update bearer response message, the SGW 702 may update S11-U MME information and reestablish a CP Opt (S11-U) connection for data transmission over the control plane. After the CP Opt (S11-U) connection is established, user data may be transmitted over the control plane via the MME rather than the user plane.

Figure 8:
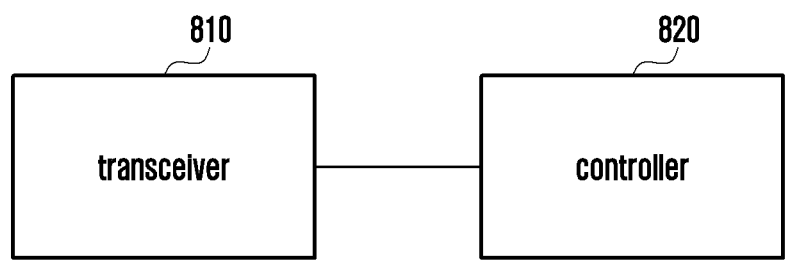
FIG. 8 is a diagram of a configuration of an MME, according to an embodiment.

FIG. 8 is a diagram of a configuration of an MME, according to an embodiment. As shown in FIG. 8, the MME may include a transceiver 810 and a controller 820.

The transceiver 810 of the MME may communicate messages with network nodes (e.g., eNB, SGW, and PGW) or a UE. For this purpose, the transceiver 810 may include a wireline or wireless interface.

The controller 820 of the MME may control overall operations of the MME. The controller 820 of the MME may receive a message including a big data flag from an SGW and trigger an S1-U bearer establishment procedure. The controller 820 of the MME may establish an S1-U bearer for data transmission over a user plane.

The controller 820 of the MME may transmit a paging message to a UE in an ECM-IDLE state and establish an S1-U bearer through an S1-U switching or bearer modification procedure for data transmission to the UE in an ECM-ACTIVE state. If big data transmission is completed, the controller 820 of the MME may perform an S1 release procedure.

The controller 820 of the MME may receive a downlink data notification message from an SGW 202 and transmit the paging message including the big data flag to a UE 205. The controller 820 of the MME may perform an S1-U bearer establishment procedure and, if big data transmission is completed, perform an S1 release procedure. These procedures may be performed as described with reference to FIG. 2.

The controller 820 of the MME may receive a downlink data notification message (including a big data flag) from an SGW 302 and transmit a paging message to a UE 305. Upon receipt of the big data flag, the controller 820 of the MME may perform an S1-U bearer establishment procedure regardless of a service request (S1-U or S11-U) received from the UE 305 and, if big data transmission is completed, perform an S1 release procedure. These procedures may be performed as described with reference to FIG. 3.

The controller 820 of the MME may receive a control plane service request message including an active flag set to 1 from a UE 505 so as to release an S11-U bearer in the control plane and set up an S1-U bearer in the user plane. The controller 820 of the MME may also perform an S1 release procedure after big data transmission over the S1-U bearer is completed. These procedures may be performed as described with reference to FIG. 5.

The controller 820 of the MME may receive downlink data including a big data flag from an SGW 602 and perform an S1 release procedure to release an S11-U bearer in the control plane. As in the second embodiment of the disclosure, the controller 820 of the MME may also perform a procedure for establishing an S1-U bearer in the user plane. If big data transmission over the S1-U bearer is completed, the controller 820 of the MME may perform the S1 release procedure. The procedures may be performed as described with reference to FIG. 6.

The controller 820 of the MME may receive an update bearer request message including a big data flag from an SGW 702 and set up an E-RAB (S1-U) for data transmission over the user plane. If a big data transmission through the E-RAB (S1-U) in the user plane is completed, the controller 820 of the MME may perform an E-RAB release procedure for data transmission over the control plane. These procedures may be performed as described with reference to FIG. 7.

A large amount of user packets being transmitted to an MME via control plane signaling is likely to cause MME system overload, which makes it difficult to guarantee the reliability of data transmission. Retransmission of user packets caused by a failure to guarantee data transmission reliability is likely to lead to user packet overload to the MME. An overload control mechanism for resolving the overload situation may impact user packets for other subscribers, resulting in extension of the reliability problem to all user packets arriving at the MME.

The methods of the disclosed embodiments are advantageous in terms of guaranteeing reliability of downlink data even when big data arrives while transmitting user data through a CP Opt connection in the control plane. The methods of the disclosed embodiments are also advantageous in terms of obviating any possibility of MME overload by transmitting user packets carrying big data over the S1-U user plane connection between an eNB and an SGW.

Failure to secure data transmission reliability for user packets may lead to a user packet-processing overload of the MME. This may trigger an overload control mechanism, which is likely to restrict the user packets for other subscribers as well and raise a problem in reliability of all user packets being transmitted to the MME.

As described above, the disclosed method and apparatus is advantageous in terms of securing reliability of user packets constituting downlink big data transmitted over the control plane in the CP Opt mode. The disclosed method and apparatus is also advantageous in terms of avoiding an overload of the MME by processing user packets via an S1-U user plane interface between an eNB and an SGW.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an ASIC.

Various embodiments of the present disclosure may be implemented by software including an instruction stored in a machine-readable storage media readable by a machine (e.g., a computer). The machine may be a device that calls the instruction from the machine-readable storage media and operates depending on the called instruction and may include the electronic device. When the instruction is executed by the processor, the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A downlink data transmission method of a mobility management entity (MME) in a wireless communication system, the method comprising:
   transmitting downlink data through an S11-U bearer on a control plane in a control plane optimization (CP Opt) mode;
   receiving, from a serving gateway (SGW), an update bearer request including information necessary for transmitting the downlink data over a user plane in case that a size of the downlink data from a packet gateway (PGW) is greater than a predetermined size;
   transmitting an evolved-radio access bearer (E-RAB) setup request including a radio bearer between a terminal and a base station, and an S1 bearer on the user plane between the base station and the SGW to the base station based on the information; and
   transmitting, to the terminal, the downlink data through the E-RAB established according to the E-RAB setup request,
   wherein whether the size of the downlink data from the PGW is greater than a predetermined size is identified by the SGW, and
   wherein the information is set by the SGW, in case that the size of the downlink data from the PGW is greater than a predetermined size.

2. The method of claim 1, wherein the terminal supports the CP Opt mode.

3. The method of claim 1, wherein the information necessary for transmitting the downlink data over the user plane comprises a big data flag indicating whether the SGW receives the downlink data greater than the predetermined size from a packet gateway (PGW), and the MME transmits the E-RAB setup request to the base station based on the big data flag.

4. The method of claim 1, wherein the information necessary for transmitting the downlink data over the user plane comprises an internet protocol (IP) address, interface type, and tunnel endpoint identifier (TEID) of the SGW for establishing a connection between the base station and the SGW, and the MME includes the IP address, interface type, and TEID in the E-RAB setup request.

5. The method of claim 4, further comprising:
   receiving an E-RAB setup response including an IP address of the base station from the base station in response to the E-RAB setup request; and
   transmitting an update bearer response including the IP address of the base station to the SGW,
   wherein the S11-U bearer of the control plane is switched to an S1-U bearer of the user plane based on the interface type, the S1-U bearer is established based on the IP address of the SGW and the IP address of the base station, and data are transmitted through the S1-U bearer in the user plane.

6. The method of claim 1, further comprising:
   receiving an update bearer request including information for releasing the E-RAB from the SGW based on completion of downlink data transmission; and
   transmitting an E-RAB release command to the base station based on the information.

7. The method of claim 6, wherein the information for releasing the E-RAB comprises a big data flag indicating whether the SGW completes receiving the downlink data greater than the predetermined size from a PGW, and the MME transmits an E-RAB release command to the base station based on the big data flag.

8. The method of claim 6, wherein the information for releasing the E-RAB comprises an internet protocol (IP) address, an interface type, and a TEID for establishing a connection between the MME and the SGW, and the MME includes the IP address, interface type, and TEID in the E-RAB release command.

9. The method of claim 8, further comprising:
receiving an E-RAB release response from the base station in response to an E-RAB release request; and
transmitting an update bearer response including the IP address of the MME to the SGW,
wherein an S1-U bearer of the user plane is switched to the S11-U bearer of the control plane based on the interface type, the S11-U bearer is established based on the IP address of the SGW and the IP address of the MME, and the downlink data are transmitted through the S11-U bearer in the CP Opt mode.

10. A mobility management entity (MME) for transmitting downlink data in a wireless communication system, the MME comprising:
a transceiver configured to transmit and receive signals; and
a controller configured to:
transmit downlink data through an S11-U bearer on a control plane in a control plane optimization (CP Opt) mode;
receive, from a serving gateway (SGW), an update bearer request including information necessary for transmitting the downlink data over a user plane in case that a size of the downlink data from a packet gateway (PGW) is greater than a predetermined size;
transmit an evolved-radio access bearer (E-RAB) setup request including a radio bearer between a terminal and a base station, transmit an S1 bearer on the user plane between the base station and the SGW to the base station based on the information; and transmit to the terminal, the downlink data through the E-RAB established according to the E-RAB setup request,
wherein whether the size of the downlink data from the PGW is greater than a predetermined size is identified by the SGW, and
wherein the information is set by the SGW, in case that the size of the downlink data from the PGW is greater than a predetermined size.

11. The MME of claim 10, wherein the terminal supports CP Opt mode.

12. The MME of claim 10, wherein the information necessary for transmitting the downlink data over the user plane comprises a big data flag indicating whether the SGW receives the downlink data greater than the predetermined size from a packet data_network gateway (PGW), and the MME transmits the E-RAB setup request to the base station based on the big data flag.

13. The MME of claim 10, wherein the information necessary for transmitting the downlink data over the user plane comprises an internet protocol (IP) address, interface type, and tunnel endpoint identifier (TEID) of the SGW for establishing a connection between the base station and the SGW, and the MME includes the IP address, interface type, and TEID in the E-RAB setup request.

14. The MME of claim 10, wherein the controller is further configured to: receive an E-RAB setup response including an IP address of the base station from the base station in response to the E-RAB setup request; and
transmit an update bearer response including the IP address of the base station to the SGW,
wherein the S11-U bearer of the control plane is switched to an S1-U bearer of the user plane based on the interface type, the S1-U bearer is established based on an IP address of the SGW and the IP address of the base station, and data are transmitted through the S1-U bearer in the user plane.

15. The MME of claim 10, wherein the controller is further configured to: receive the update bearer request including information for releasing the E-RAB from the SGW based on completion of downlink data transmission; and
transmit an E-RAB release command to the base station based on the information.

16. The MME of claim 15, wherein the information for releasing the E-RAB comprises a big data flag indicating whether the SGW completes receiving the downlink data greater than the predetermined size from a PGW, and the MME transmits an E-RAB release command to the base station based on the big data flag.

17. The MME of claim 15, wherein the information for releasing the E-RAB comprises an internet protocol (IP) address, an interface type, and a TEID for establishing a connection between the MME and the SGW, and transmitting E-RAB release command including the IP address, interface type, and TEID.

18. The MME of claim 15, wherein the controller is further configured to: receive an E-RAB release response from the base station in response to an E-RAB release request; and
transmit a update bearer response including the IP address of the MME to the SGW,
wherein an S1-U bearer of the user plane is switched to the S11-U bearer of the control plane based on the interface type, the S11-U bearer is established based on the IP address of the SGW and the IP address of the MME, and the downlink data are transmitted through the S11-U bearer in the CP Opt mode.

* * * * *